United States Patent Office 3,120,519
Patented Feb. 4, 1964

3,120,519
PYRIDYL ALKENES
George de Stevens, Willow Knoll, New Providence, and Charles Ferdinand Huebner, Chatham, N.J., assignors to Ciba Corporation, a corporation of Delaware
No Drawing. Filed May 8, 1959, Ser. No. 811,815
9 Claims. (Cl. 260—240)

The present application concerns unsaturated amines. More particularly, it relates to compounds of the formula

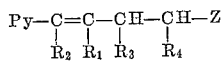

in which Py stands for a pyridyl radical, $R_1$ represents a monocyclic carbocyclic aryl radical or a monocyclic heterocyclic aryl radical, each of the radicals $R_2$, $R_3$ and $R_4$ stands for hydrogen or lower alkyl and Z represents a tertiary amino group, salts or quaternary ammonium compounds thereof, as well as process for the preparation thereof.

The pyridyl radical Py is particularly a 2-pyridyl radical. Also included in the scope of the present invention are 4-pyridyl and 3 pyridyl radicals. These radicals are preferably unsubstituted; possible substituents are lower preferably unsubstituted; possible substituents are lower alkyl, e.g. methyl or ethyl, lower alkoxy, e.g. methoxy or ethoxy, or halogen, e.g. chlorine or bromine.

$R_1$, when standing for a monocyclic carbocyclic aryl radical, represents phenyl or substituted phenyl. One or more than one substituent may be attached to any of the available positions. They are represented by lower alkyl, e.g. methyl or ethyl, lower alkoxy, e.g. methoxy of ethoxy, lower alkylenedioxy, e.g. methylenedioxy, lower alkoyl, e.g. acetyl, lower alkyl-mercapto, e.g. methylmercapto or ethylmercapto, nitro, amino, particularly tertiary amino, such as di-lower alkyl-amino, e.g. dimethylamino or diethylamino, halogen, e.g. fluorine, chlorine or bromine, or polyhalogeno-lower alkyl, e.g. trifluoromethyl. Substituted phenyl may, therefore, be represented, for example, by lower alkyl-phenyl, lower alkoxy-phenyy, lower alkylenedioxy-phenyl, lower alkoyl-phenyl, lower alkyl-mercapto-phenyl, nitro-phenyl, di-lower alkyl-amino-phenyl, halogeno-phenyl or polyhalogeno-lower alkyl-phenyl.

In a monocyclic heterocyclic aryl radical $R_1$ nitrogen or sulfur atoms represent the hetero atoms of the heterocyclic nucleus. Such nuclei may, therefore, be represented by pyridyl which may be identical with the radical designated as Py, or by a thienyl radical, particularly a 2-thienyl radical, which may contain as further substituents lower alkyl, e.g. methyl or ethyl, lower alkoxy, e.g. methoxy or ethoxy, or halogen, e.g. chlorine or fluorine.

The radicals $R_2$, $R_3$ and $R_4$ represent hydrogen or may be lower alkyl, particularly methyl.

The tertiary amino group Z represents primarily N,N-di-lower hydrocarbon-amino, N,N-lower alkylene-imino, N,N-lower oxa-alkylene-imino, N,N-lower thia-alkylene-imino or N,N-lower aza-alkylene-imino group. Lower hydrocarbon radicals of an N,N-di-lower hydrocarbon-amino group are, for example, lower alkenyl, lower cycloalkyl, carbocyclic aryl, carbocyclic aryl-lower alkyl, or primarily lower alkyl radicals containing from one to seven carbon atoms. Such radicals are, for example, methyl, ethyl, propyl, isopropyl, butyl, isobutyl, pentyl, neopentyl, allyl, methallyl, cyclopentyl, cyclohexyl, phenyl or benzyl. Therefore, N,N-di-lower hydrocarbonamino groups are especially represented by N,N-di-lower alkyl-amino, e.g. dimethylamino, diethylamino, dipropylamino or di-isopropylamino groups, or, in addition, by N-methyl-N-cyclopentylamino or N-methyl-N-benzylamino groups. The lower alkylene portion of N,N-lower alkylene-imino, N,N-lower oxa-alkylene-imino, N,N-lower thia-alkylene-imino or N,N-lower aza-alkylene-imino contains preferably from four to six carbon atoms. Together with the nitrogen atom such lower alkylene, lower oxa-alkylene, lower thia-alkylene or lower aza-alkylene radicals represent, for example, pyrrolidino radicals, e.g. pyrrolidino or 2-methyl-pyrrolidino, piperidino radicals, e.g. piperidino, 2-methyl-piperidino, 3-methyl-piperidino, 4-methyl-piperidino, 3-hydroxy-piperidino, 3-acetoxy-piperidino or 3-hydroxymethyl-piperidino, hexamethyleneimino, morpholino, thia-morpholino, or piperazino radicals, e.g. 4-methyl-piperazino, 4-hydroxyethyl-piperazino or 4-acetoxy-ethyl-piperazino.

Salts of the compounds of this invention are particularly therapeutically acceptable acid addition salts with inorganic acids, particularly mineral acids, such as hydrohalic acids, e.g. hydrochloric or hydrobromic acid, sulfuric or phosphoric acids, or with organic acids, for example, carboxylic acids, such as acetic, propionic, glycolic, lactic, pyruvic, succinic, maleic, hydroxymaleic, dihydroxymaleic, fumaric, malic, tartaric, citric, benzoic, cinnamic, mandelic or salicylic acid, or organic sulfonic acids, e.g. methane sulfonic, ethane sulfonic or hydroxyethane sulfonic acid. Mono- or poly-salts may be formed, depending on the procedure used for the preparation of the salts and the number of salt-forming groups present in the molecule.

Non-toxic quaternary ammonium derivatives of the compounds of this invention are particularly those with reactive esters formed by aliphatic hydroxy-compounds with strong acids; such acids are particularly mineral acids, such as hydrohalic acids, e.g. hydrochloric, hydrobromic or hydriodic acids, or organic sulfonic acids, such as lower alkane sulfonic acids, e.g. methane or ethane sulfonic acid or lower hydroxy-alkane sulfonic acid, e.g. 2-hydroxy-ethane sulfonic acid. Such esters are especially lower alkyl halides, e. g. methyl, ethyl, propyl or isopropyl chloride, bromide or iodide, lower alkyl lower alkane sulfonates, e.g. methyl or ethyl methane or ethane sulfonate, or lower alkyl hydroxy-lower alkane sulfonates, e.g. methyl 2-hydroxyethane sulfonate. Also included as quaternary ammonium compounds are the quaternary ammonium hydroxides, and the salts of such quaternary ammonium hydroxides with inorganic, or particularly with organic carboxylic or sulfonic acids, such as with those described hereinbefore as being suitable for the preparation of acid addition salts. Mono- or poly-quaternary ammonium compounds may be formed, depending on the reaction conditions used and the number of tertiary amino groups present in the molecule.

The compounds of this invention may be obtained in the form of mixtures of cis- and trans-isomers or of the single cis- or trans-isomer. Furthermore, compounds, in which $R_3$ and/or $R_4$ represent lower alkyl, may form racemates which may be resolved into antipodes.

The compounds of the present invention exhibit a variety of valuable pharmacological effects and are, therefore, intended to be used as agents to relieve bodily disorders or symptoms thereof. They may have primarily antihypertensive effects, which may be utilized to lower the blood pressure, particularly in connection with heart diseases, toxemia, etc. Furthermore, some of the compounds have analgetic properties and are intended to be used as analgetics having improved characteristics; for example, they are remarkably free from side effects generally associated with analgetics. These compounds may, therefore, be used both in animals and humans to raise the threshold of pain, which is of particular importance in post-operative states after minor or major surgery, in states of chronic pains, such as headaches, or in connection with arthritic diseases. In addition, they may have antihistaminic, sedative and/or local anesthetic effects, which effects may be utilized to relieve allergic diseases caused by an excess of histamine, states of excitement and nervousness, and minor local surgery, respectively.

The compounds of this invention may be used as medicaments in the form of pharmaceutical preparations, which contain the new tertiary amines, the salts or the quaternary ammonium compounds thereof in admixture with a pharmaceutical organic or inorganic, solid or liquid carrier suitable for enteral, e.g. oral, or parenteral administration. For making up the preparations there can be employed substances which do not chemically react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in the solid form, for example, as capsules, tablets or dragees, or in liquid form, for example, as solutions, e.g. isotonic saline solutions, or as suspensions or emulsions. If desired, they may contain auxiliary substances such as preserving agents, stabilizing agents, wetting or emulsifying agents, salts for varying the osmotic pressure or buffers. They may also contain, in combination, other therapeutically useful substances.

The compounds of this invention may be prepared by dehydrating tertiary alcohols of the formula

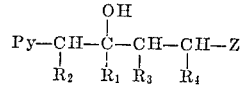

in which Py, $R_1$, $R_2$, $R_3$, $R_4$ and Z have the previously-given meaning, or salts thereof, and, if desired, converting a resulting salt into the free base, and/or, if desired, converting a free base into a salt or a quaternary ammonium compound thereof, and/or, if desired, separating resulting mixtures of isomeric compounds into the single compounds.

The dehydration of the tertiary alcohols or the salts thereof may be achieved by treatment with an acidic dehydrating reagent. Such reagents are primarily mineral or equivalent acids, anhydrides or halides thereof. Suitable mineral acids are, for example, hydrohalic acids, particularly hydrochloric acid; these acids may be used in gaseous form, for example, by conducting the acid through a solution of the tertiary alcohol, or may be employed in solution, for example, in a concentrated aqueous solution, to which may be addedt an additional solvent, such as, for example, a lower alkanol, e.g. methanol or ethanol, or a lower alkanoic acid, e.g. acetic acid. Sulfuric acid, especially in its concentrated form, or phosphoric acid, especially in the form of polyphosphoric acid (a mixture of phosphoric acid with its anhydride, phosphorus pentoxide), may also be used as dehydrating agents. Anhydrides of mineral acids are, for example, the already mentioned phosphorous pentoxide; halides, particularly chlorides of mineral or equivalent acids may be represented by thionyl chloride.

Organic acids may also be suitable for the dehydration of the tertiary alcohols; such acids are, for example, monocyclic carbocyclic aryl sulfonic acid, e.g. p-toluene sulfonic acid, which may be used simultaneously with a water separator to remove the generated water from the reaction mixture.

Dehydrating agents are also alkanoic acid halides, especially chlorides, in which the alkanoic acid contains from two to three carbon atoms; acetyl chloride or propionyl chloride are the preferred reagents.

The dehydration reaction may be carried out in the absence or presence of a solvent; the choice of the latter depends primarily on its solubilizing properties and/or its inertness towards the dehydrating reagent. Thus, mineral acids may be used in the presence of lower alkanols, e.g. methanol or ethanol, or of lower alkanoic acids, e.g. acetic acid, whereas thionyl chloride or lower alkanoic acid halides are preferably used in the presence of a monocyclic carbocyclic aryl hydrocarbon, e.g. benzene, toluene or xylene.

The reaction may be carried out under cooling or, if necessary, at an elevated temperature, and/or under pressure or in the atmosphere of an inert gas, e.g. nitrogen.

The resulting product may be isolated by extraction, absorption and elution, distillation, crystallization, etc., and purified by distillation, recrystallization, salt formation, etc.

The tertiary alcohols of the formula

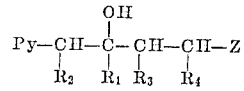

in which Py, $R_1$, $R_2$, $R_3$, $R_4$ and Z have the previously-given meaning, and which are used as the starting materials, may be prepared, for example, by reacting a ketone of the formula

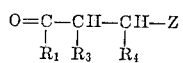

in which $R_1$, $R_3$, $R_4$ and Z have the previously-given meaning, with an alkali metal salt of a compound of the formula

in which Py and $R_2$ have the previously-given meaning. Such alkali metal compounds are, for example, the sodium, or primarily, the lithium salts, which may be prepared, for example, by treating a lower alkyl-pyridine, e.g. α-picoline, γ-picoline, 2-ethyl-pyridine, 2-propyl-pyridine, 2-isopropyl-pyridine, 2,6-lutidine, etc., with a phenyl alkali metal compound, e.g. phenyl lithium, or a lower alkyl alkali metal compound, e.g. butyl lithium. An excess of the pyridine compound may be used instead of an additional solvent, which may be represented, for example, by hydrocarbons, such as alkanes, e.g. hexane, or monocyclic carbocyclic aryl hydrocarbons, e.g. benzene or toluene, or by ethers, e.g. diethyl ether or tetrahydrofurane. An alkali metal or an alkali metal amide, e.g. lithium or sodium amide, in liquid ammonia or in an inert solvent, e.g. toluene, may also serve for the formation of the lower alkyl-pyridine salt.

The reaction with the ketone may be carried out in the presence of an inert solvent, for example, the solvents used in the preparation of the alkali metal compound, i.e. an ether, e.g. diethylether, or an aromatic hydrocarbon, e.g. benzene or toluene. Cooling may be required, or the reaction may be performed at room temperature or, if necessary, at an elevated temperature, and advantageously in the atmosphere of an inert gas, e.g. nitrogen.

The compounds of this invention are obtained in the form of the free bases or as the salts thereof. A salt may be converted into the free base, for example, by reaction with an alkaline reagent, such as an aqueous alkali metal hydroxide, e.g. lithium, sodium or potassium hydroxide, an aqueous alkali metal carbonate, e.g. sodium carbonate or potassium hydrogen carbonate, or aqueous ammonia. A free base may be converted into its therapeutically useful acid addition salts by reaction with one of the inorganic or organic acids outlined hereinbefore, for example, by treating a solution of the base in a lower alkanol, e.g. methanol, ethanol, propanol or isopropanol, or in another appropriate solvent or a mixture of solvents with the acid or a solution thereof. Mono- or poly-salts may be formed depending on the conditions of the salt-formation and/or the number of salt-forming groups. The salts may also be obtained as the hemihydrates, monohydrates, sesquihydrates or polyhydrates depending on the conditions used in the formation of the salts.

Non-toxic quarternary ammonium derivatives of the compounds of this invention may be obtained, for example by reacting the tertiary base with an ester formed by a hydroxylated lower hydrocarbon compound and a strong inorganic or organic acid. These esters are specifically lower alkyl halides, e.g. methyl, ethyl or propyl chloride, bromide or iodide, or lower alkyl lower alkane sulfonates, e.g. methyl or ethyl methane sulfonate or ethane sulfonate. The quaternizing reactions may be performed in the presence of a solvent; suitable solvents are more especially lower alkanols, e.g. methanol, ethanol, propanol, isopropanol, butanol or pentanol; lower alkanones, e.g. acetone or methyl ethyl ketone; or organic acid amides, e.g. formamide or dimethylformamide. Pressure and/or the atmosphere of an inert gas may be required.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electrodialysis. From a resulting quaternary ammonium base there may be prepared therapeutically suited quaternary ammonium salts by reaction with acids, for example, with those outlined hereinbefore for the preparation of the acid addition salts. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also crystallize as the hydrates; mono- or poly-quaternary ammonium compounds may be formed depending on the conditions of the quaternizing reaction and/or the number of tertiary amino groups present in the molecule.

The compounds of the present application may be obtained in different stereoisomeric (cis-trans) forms or in mixtures thereof; the latter may be separated on the basis of their different physico-chemical properties, e.g. solubility, etc.

Furthermore, compounds having more than one asymmetric carbon atom may be obtained as a mixture of racemates, which may be separated into the single racemates on the basis of physico-chemical differences, such as solubility, for example, by crystallization or fractionated crystallization.

The single racemates of compounds with at least one asymmetric carbon atom may be resolved into the optically active antipodes according to procedures known for the resolution of racemic compounds. For example, to the free base of a racemic d,l-compound, dissolved in a solvent, such as a lower alkanol, e.g., methanol or ethanol, may be added one of the optically active forms of an acid containing an asymmetric carbon atom, or a solution thereof, for example, in the same lower alkanol or in water or in a mixture of such solvents; a salt may then be isolated, which is formed by the optically active acid with one of the optically active forms of the base. Especially useful as optically active forms of salt-forming acids having an asymmetric carbon atom are D- and L-tartaric acid; the optically active forms of malic, mandelic, camphor sulfonic or quinic acid may also be employed. From this salt, the free and optically active base may be obtained according to process known for the conversion of a salt into a base, for example, as outlined hereinbefore. An optically active base may be converted into a therapeutically useful acid addition salt with one of the acids mentioned hereinbefore, or may be converted into a non-toxic quaternary ammonium compound. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

The following examples are intended to illustrate the invention and are not to be construed as being limitations thereon. Temperatures are given in degrees Centigrade.

*Example 1*

To a solution of 1.4 g. of 4-dimethylamino-1-(2-pyridyl)-2-(2-thienyl)-2-butanol in toluene is added 0.831 g. of propionyl chloride. The reaction mixture is allowed to stand at room temperature, the solvent is separated from the resulting oil by decantating the former and the oily residue is dissolved in ethanol. A saturated solution of hydrogen chloride in ethanol is added and the crystalline 2-[4-dimethylamino-2-(2-thienyl)-1-butenyl]-pyridine dihydrochloride precipitates. It is recrystallized from ethanol and melts at 198–200°.

By dissolving the dihydrochloride in a minimum amount of water, adding aqueous ammonia and extracting with ether, the 2-[4-dimethylamino-2-(2-pyridyl)-1-butenyl]-pyridine can be isolated.

The starting material may be obtained as follows: 70.5 g. of bromobenzene is slowly added to 6.3 g. of lithium in ether while stirring and in an atmosphere of dry nitrogen. The reaction mixture is stirred for one-half hour at room temperature, 31.3 g. of α-picoline is added and stirring is continued for an additional three hours at the same temperature.

To the α-picoline lithium reagent is given a solution of 20 g. of 3-dimethylamino-1-(2-thienyl)-1-propanone in 50 ml. of ether; the mixture is stirred for one hour and and then allowed to stand for thirteen days at room temperature. The solvent is decanted and any unreacted lithium is destroyed with ethanol, the ethanol solution is filtered, the solvent is evaporated and the residue is taken up on water. The organic material is extracted into ether, the ether phase is washed with dilute aqueous hydrochloric acid, the acid layer is separated and basified with aqueous sodium hydroxide. The alkaline solution is extracted with ether, the organic portion is dried over sodium sulfate, the solvent is evaporated and the residue distilled. The desired 4-dimethylamino-1-(2-pyridyl) - 2 - (2-thienyl)-2-propanol is collected at 160–162°/0.4 mm.

*Example 2*

A mixture of 2 g. of the crystalline β-racemate of 3-methyl-2-phenyl-1-(2-pyridyl) - 4 - (1 - pyrrolidino)-2-butanol and 10 ml. of 85 percent aqueous sulfuric acid is heated on the steam bath for fifteen minutes, then cooled, diluted with water and made basic with aqueous ammonia. The organic material is extracted with ether, the ether phase is washed with water, dried over sodium sulfate and evaporated. The oily 2-[3-methyl-2-phenyl-4-(1-pyrrolidino)-1-butenyl]-pyridine is converted to the dihydrochloride by adding ethanol containing hydrogen chloride to an ethanol solution of the free base and diluting with ether. The hydroscopic 2-[3-methyl-2-phenyl-4-(1-pyrrolidino) - 1 - butenyl] - pyridine dihydrochloride melts at 162–164° after recrystallization from a mixture of ethanol and ether.

The starting material may be prepared as follows: 0.64 mol of α-picoline is added dropwise to an ether solution of 0.64 mol of phenyl lithium (prepared from 9.1 g. of lithium and 101 g. of bromobenzene) while stirring and under an atmosphere of dry nitrogen. After stirring for two hours at room temperature, the reaction mixture is cooled in an ice bath and 0.52 mol (113 g.) of 2-methyl-1-phenyl-3-(1-pyrrolidino)-1-propanone is given to the reagent solution. A precipitate forms which is dissolved upon adding more ether. Immediately after the addition is completed the reaction mixture is poured into ice water; the ether layer is separated, washed with water, dried over sodium sulfate and evaporated. Upon standing the residue crystallizes partially, ether is added, the crystalline β-racemate of 3-methyl-2-phenyl-1 - (2-pyridyl) - 4 - (1-pyrrolidino)-2-butanol is filtered off and washed with a minimum amount of water, M.P. 85°; yield: 20 g.

Example 3

Upon dehydrating 4-dimethylamino-2-phenyl-1-[2-pyridyl]-2-butanol according to the procedure of Example 2, the 2-(4-dimethylamino-2-phenyl-1-butenyl)-pyridine may be obtained and characterized as its dihydrochloride.

The starting material may be prepared as follows: To 0.34 mol of phenyl lithium (prepared from 6.2 g. of lithium and 69 g. of bromobenzene) is added dropwise 31.6 g. of α-picoline. After stirring for three hours, an ether solution of 20 g. of β-dimethylamino-propiophenone is added while stirring, and the reaction mixture is allowed to stand at room temperature overnight. The mixture is filtered, the filtrate is treated with water, the organic material is taken up in ether, which solution in turn is extracted with fifteen percent aqueous hydrochloric acid. The acidic layer is made basic with aqueous ammonia and the organic base is extracted with ether. The ether layer is dried and evaporated, and the residue is distilled to yield the 4-dimethylamino - 2 - phenyl-1-(2-pyridyl)-2-butanol, B.P. 125–145°/0.4 mm.; yield: 9 g.

Example 4

Treatment of 4-dimethylamino-3-methyl-2-phenyl-1-(2-pyridyl)-2-butanol with a mixture of concentrated hydrochloric acid and acetic acid furnishes the 2-(4-dimethylamino-3-methyl-2-phenyl - 1 - butenyl)-pyridine, which may be converted to the dihydrochloride.

The starting material may be prepared as follows: A mixture of 224 g. of propiophenone, 176 g. of dimethylamine hydrochloride, 66 g. of paraformaldehyde, 3.33 ml. of hydrochloric acid and 266 ml. of ethanol is refluxed for two hours. After evaporation of the organic solvent, water is added and the water-insoluble material is extracted with ether. The aqueous layer is made basic with aqueous ammonia and the organic base is extracted with ether. The ether is washed, dried and evaporated to yield 149 g. of β-dimethylamino-α-methyl-propiophenone.

To 0.5 mol of phenyl lithium, prepared from 9.1 g. of lithium and 67.5 g. of bromobenzene, is added dropwise, while stirring and in a nitrogen atmosphere, 49 ml. of α-picoline and after three hours 31.8 g. of β-dimethylamino-α-methyl-propiophenone. After standing overnight at room temperature the excess lithium is filtered off, the filtrate is poured into ice-water and the mixture extracted with ether. The ether layer is washed, dried and evaporated; the residue is distilled, 150–160°/0.6 mm., to yield 69 g. of 4-dimethylamino-3-methyl-2-phenyl-1-(2-pyridyl)-2-butanol.

Other (1-butenyl)-pyridine derivatives, which may be prepared upon dehydrating corresponding 1-pyridine-2-butanols may be, for example, 2-[2-phenyl-4-(1-piperidino)-1-butenyl]-pyridine, 2-[2-(4 - chloro-phenyl)-4-dimethylamino-1-butenyl]-pyridine, 2 - [4-dimethylamino-2-(4-methoxy-phenyl)-3-methyl-1-butenyl] - pyridine, 4-(4-dimethylamino-2-phenyl - 1 - butenyl) - pyridine, 2-[4-dimethylamino-2-(3-pyridyl)-1-butenyl] - pyridine, 2-(4-dimethylamino - 1 - methyl-2-phenyl-1-butenyl) - pyridine, 2-(4-diethylamino-2-phenyl-1-butenyl) - 6 - methyl-pyridine, and 2-[4-(1-morpholino)-2-(4-pyridyl)-1-butenyl]-pyridine, and the like.

What is claimed is:
1. A member selected from the group consisting of compounds of the formula

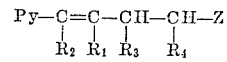

in which Py stands for a member selected from the group consisting of pyridyl, lower alkyl-pyridyl, lower alkoxy-pyridyl and halo-pyridyl, $R_1$ is a member selected from the group consisting of phenyl and phenyl substituted by lower alkyl, lower alkoxy, lower alkylenedioxy, lower alkoyl, lower alkyl-mercapto, nitro, N,N-di-lower alkyl-amino, halogeno and trifluoromethyl, pyridyl and thienyl, each of the radicals $R_2$, $R_3$ and $R_4$ is a member selected from the group consisting of hydrogen and lower alkyl, and Z stands for a member of the group consisting of N,N-di-lower alkyl-amino, N,N-lower alkylene-imino, in which alkylene has from four to six carbon atoms, N,N-lower oxa-alkylene-imino, in which alkylene has from four to six carbon atoms, N,N-lower thia-alkylene-imino, in which alkylene has from four to six carbon atoms, and N,N-lower aza-alkylene-imino, in which alkylene contains from four to six carbon atoms, therapeutically acceptable acid addition salts thereof and lower alkyl quaternary ammonium compounds thereof.

2. 4 - N,N-di-lower alkyl-amino - 2 - phenyl-1-butenyl-pyridine.

3. 2-(4-dimethylamino - 2 - phenyl - 1 - butenyl)-pyridine.

4. 4-N,N-di-lower alkyl-amino - 3-lower alkyl-2-phenyl-1-butenyl-pyridine.

5. 2-(4-dimethylamino-3 - methyl-2-phenyl-1-butenyl)-pyridine.

6. 4-N,N-di-lower alkyl-amino - 2 - thienyl-1-butenyl-pyridine.

7. 2-[4 - dimethylamino - 2 - (2 - thienyl)-1-butenyl]-pyridine.

8. 3-lower alkyl-4-N,N-lower alkyleneimino-2-phenyl-1-butenyl-pyridine, in which alkylene contains from four to six carbon atoms.

9. 2-[3-methyl-2-phenyl-4-(1 - pyrrolidino)-1-butenyl]-pyridine.

References Cited in the file of this patent

UNITED STATES PATENTS

| | | |
|---|---|---|
| 2,712,022 | Adamson | June 28, 1955 |
| 2,712,023 | Adamson | June 28, 1955 |
| 3,036,082 | Huebner | May 22, 1962 |

FOREIGN PATENTS

| | | |
|---|---|---|
| 505,509 | Belgium | Sept. 15, 1951 |
| 719,276 | Great Britain | Dec. 1, 1954 |
| 765,874 | Great Britain | Jan. 16, 1957 |
| 163,278 | Australia | June 9, 1955 |
| 937,229 | Germany | Dec. 29, 1955 |

OTHER REFERENCES

Adamson et al.: J. Chem. Soc., 1957, part 2, pages 2315 to 2326.

Adamson et al.: J. Chem. Soc., 1958, pages 312 to 324.

Barrett: J. Chem. Soc., 1958, pages 325 to 337.